United States Patent
Rost et al.

(10) Patent No.: US 12,348,384 B2
(45) Date of Patent: Jul. 1, 2025

(54) PACKET DATA UNIT SESSION FOR MACHINE LEARNING EXPLORATION FOR WIRELESS COMMUNICATION NETWORK OPTIMIZATION

(71) Applicant: Nokia Technologies Oy, Espoo (FI)

(72) Inventors: Peter Rost, Munich (DE); Cinzia Sartori, Munich (DE); Dario Bega, Munich (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 18/555,977

(22) PCT Filed: Jun. 1, 2021

(86) PCT No.: PCT/EP2021/064674
§ 371 (c)(1),
(2) Date: Oct. 18, 2023

(87) PCT Pub. No.: WO2022/253414
PCT Pub. Date: Dec. 8, 2022

(65) Prior Publication Data
US 2024/0214277 A1    Jun. 27, 2024

(51) Int. Cl.
*G06F 15/173* (2006.01)
*H04L 41/0823* (2022.01)
(Continued)

(52) U.S. Cl.
CPC .......... *H04L 41/16* (2013.01); *H04L 41/0823* (2013.01); *H04W 24/02* (2013.01)

(58) Field of Classification Search
CPC . H04L 41/16; H04L 41/0823; H04L 41/0894; H04L 41/5025; H04L 41/5067;
(Continued)

(56) References Cited

U.S. PATENT DOCUMENTS 11,593,700 B1 *  2/2023  Ansari ................ G06N 5/01
2019/0281492 A1 *  9/2019  Hans .................. H04W 4/50
(Continued)

FOREIGN PATENT DOCUMENTS

CN       112512058 A     3/2021
WO       2021/013368 A1  1/2021
(Continued)

OTHER PUBLICATIONS

Mismar et al., "Deep Reinforcement Learning for Improving Downlink mmWave Communication Performance", arXiv, Jul. 12, 2017, pp. 1-8.
(Continued)

*Primary Examiner* — Suraj M Joshi
*Assistant Examiner* — Hao H Nguyen
(74) *Attorney, Agent, or Firm* — SQUIRE PATTON BOGGS (US) LLP

(57) ABSTRACT

Devices, methods and computer programs for a packet data unit session for machine learning exploration for wireless communication network optimization are disclosed. A client device detects a trigger condition being satisfied for machine learning exploration for wireless communication network optimization. In response, the client device initiates establishment of a packet data unit (PDU) session for the machine learning exploration. The PDU session for the machine learning exploration is associated with a machine learning exploration indicator that indicates that the PDU session is reserved for machine learning exploration.

9 Claims, 6 Drawing Sheets

(51) Int. Cl.
*H04L 41/16* (2022.01)
*H04W 24/02* (2009.01)

(58) Field of Classification Search
CPC ... H04L 45/24; H04L 45/302; H04L 47/2458; H04W 24/02; H04W 24/08
See application file for complete search history.

(56) References Cited

U.S. PATENT DOCUMENTS

| | | | |
|---|---|---|---|
| 2022/0248235 A1* | 8/2022 | Thantharate | H04W 84/18 |
| 2022/0295317 A1* | 9/2022 | Challita | H04W 16/28 |
| 2022/0311826 A1* | 9/2022 | Chauhan | H04W 8/26 |
| 2022/0360501 A1* | 11/2022 | Veijalainen | H04L 43/10 |
| 2023/0056442 A1* | 2/2023 | Ly | H04W 24/08 |
| 2023/0216745 A1* | 7/2023 | Chen | H04W 24/10 370/252 |
| 2023/0232272 A1* | 7/2023 | Puente Pestaña | H04L 41/5025 370/252 |
| 2023/0345359 A1* | 10/2023 | Yang | H04W 52/0206 |

FOREIGN PATENT DOCUMENTS

| | | |
|---|---|---|
| WO | 2021/025603 A1 | 2/2021 |
| WO | 2021/078373 A1 | 4/2021 |
| WO | 2021/197578 A1 | 10/2021 |
| WO | 2021/238397 A1 | 12/2021 |
| WO | 2022/002410 A1 | 1/2022 |

OTHER PUBLICATIONS

Wang et al., "Handover optimization via asynchronous multi-user deep reinforcement learning", IEEE International Conference on Communications (ICC), May 20-24, 2018, 6 pages.

Chen et al., "Heterogeneous machine-type communications in cellular networks: Random access optimization by deep reinforcement learning", IEEE International Conference on Communications (ICC), May 20-24, 2018, 6 pages.

"Msc-generator", Sourceforge, Retrieved on Oct. 27, 2023, Webpage available at : https://sourceforge.net/projects/msc-generator/.

"3rd Generation Partnership Project; Technical Specification Group Services and System Aspects; System architecture for the 5G System (5GS); Stage 2 (Release 16)", 3GPP TS 23.501, V16.7.0, Dec. 2020, pp. 1-450.

International Search Report and Written Opinion received for corresponding Patent Cooperation Treaty Application No. PCT/EP2021/064674, dated Feb. 14, 2022, 13 pages.

* cited by examiner

PACKET DATA UNIT SESSION FOR MACHINE LEARNING EXPLORATION FOR WIRELESS COMMUNICATION NETWORK OPTIMIZATION

RELATED APPLICATION

This application claims priority to PCT Application No. PCT/EP2021/064674, filed on Jun. 1, 2021, which is incorporated herein by reference in its entirety.

TECHNICAL FIELD

The disclosure relates generally to communications and, more particularly but not exclusively, to a packet data unit session for machine learning exploration for wireless communication network optimization.

BACKGROUND

In cellular communication networks, such as Fifth generation (5G) new radio (NR) wireless networks, network optimization is an important but challenging task that may require making efficient decisions at all network levels, meeting stringent optimization criteria, e.g., ultra-high reliability and ultra-low latency.

Machine learning, such as reinforcement learning or deep reinforcement learning may be used as a decision-making tool to address these complex problems which are highly dimensional given the number of control parameters to be optimized and stringent timing constraints.

Machine learning algorithms need to be trained. For them to be trained for network optimization, data needs to be collected about the network. However, current network optimization mechanisms are suitable for collecting data for off-line training, for use e.g. in supervised and/or unsupervised learning, whereas reinforcement learning/deep reinforcement learning algorithms need to interact (such as take actions and measure their impacts/rewards) with their environment in order to learn the optimal policy. In other words, the training needs to be done on-line, i.e. on a live mobile network environment.

In yet other words, reinforcement learning/deep reinforcement learning algorithms require sensing the network by taking random actions and at least some of these random actions could harm the functionality of the network. Therefore, optimization algorithms are currently first trained by using, e.g., a simulator that generates synthetic data and model the real mobile network behaviour. Afterwards, they may be fine-tuned over a live mobile network environment. However, this is very time consuming and requires human supervision.

SUMMARY

The scope of protection sought for various example embodiments of the invention is set out by the independent claims. The example embodiments and features, if any, described in this specification that do not fall under the scope of the independent claims are to be interpreted as examples useful for understanding various example embodiments of the invention.

An example embodiment of a client device comprises at least one processor, and at least one memory including computer program code. The at least one memory and the computer program code are configured to, with the at least one processor, cause the client device to at least perform:

detecting a trigger condition being satisfied for machine learning exploration for wireless communication network optimization; and in response, initiating establishment of a packet data unit, PDU, session for the machine learning exploration. The PDU session for the machine learning exploration is associated with a machine learning exploration indicator that indicates that the PDU session is reserved for machine learning exploration.

In an example embodiment, alternatively or in addition to the above-described example embodiments, the trigger condition comprises at least one of:

a need detected by the client device to perform the machine learning exploration; or a request to perform the machine learning exploration received from a network node device.

In an example embodiment, alternatively or in addition to the above-described example embodiments, the machine learning exploration indicator comprises at least one of:

a quality-of-service, Qos, identifier value indicating machine learning exploration;

a PDU session attribute indicating machine learning exploration;

a single network slice selection assistance S-NSSAI, identifier indicating machine information, learning exploration; or a PDU session identifier indicating machine learning exploration.

In an example embodiment, alternatively or in addition to the above-described example embodiments, exploration data for the machine learning exploration comprises at least one of:

randomly generated data;

data generated based on previously recorded data; or data generated based on a parallel, non-machine learning exploration, PDU session.

In an example embodiment, alternatively or in addition to the above-described example embodiments, the PDU session is to be established between the client device and a user plane function entity.

In an example embodiment, alternatively or in addition to the above-described example embodiments, the wireless communication network optimization comprises at least one of:

mobility optimization to be performed by an access and mobility management function, AMF, entity;

traffic steering optimization to be performed by a session management function, SMF, entity;

training of QoS handling to be performed by a user plane function entity;

training of a time-sensitive networking, TSN, related functionality to be performed by the user plane function entity;

training of a radio specific procedure to be performed by a base station device;

protocol specific optimization to be performed by the base station device;

training of at least one of detection, decoding or power control to be performed by the client device;

generating analytics related to radio access technology, RAT, or frequency selection to be performed by a network data analytics function, NWDAF, entity; or traffic steering to be performed by the NWDAF entity.

An example embodiment of a client device comprises means for performing:

detecting a trigger condition being satisfied for machine learning exploration for wireless communication network optimization; and in response, initiating establishment of a packet data unit, PDU, session for the machine learning exploration. The PDU session for the machine learning exploration is associated with a machine learning exploration indicator that indicates that the PDU session is reserved for machine learning exploration.

An example embodiment of a method comprises detecting, by a client device, a trigger condition being satisfied for machine learning exploration for wireless communication network optimization. The method further comprises initiating in response, by the client device, establishment of a packet data unit, PDU, session for the machine learning exploration, the PDU session for the machine learning exploration being associated with a machine learning exploration indicator indicating that the PDU session is reserved for machine learning exploration.

In an example embodiment, alternatively or in addition to the above-described example embodiments, the trigger condition comprises at least one of:
- a need detected by the client device to perform the machine learning exploration; or
- a request to perform the machine learning exploration received from a network node device.

In an example embodiment, alternatively or in addition to the above-described example embodiments, the machine learning exploration indicator comprises at least one of:
- a quality-of-service, Qos, identifier value indicating machine learning exploration;
- a PDU session attribute indicating machine learning exploration;
- a single network slice selection assistance information, S-NSSAI, identifier indicating machine learning exploration; or
- a PDU session identifier indicating machine learning exploration.

In an example embodiment, alternatively or in addition to the above-described example embodiments, exploration data for the machine learning exploration comprises at least one of:
- randomly generated data;
- data generated based on previously recorded data; or
- data generated based on a parallel, non-machine learning exploration, PDU session.

In an example embodiment, alternatively or in addition to the above-described example embodiments, the PDU session is to be established between the client device and a user plane function entity.

In an example embodiment, alternatively or in addition to the above-described example embodiments, the wireless communication network optimization comprises at least one of:
- mobility optimization to be performed by an access and mobility management function, AMF, entity;
- traffic steering optimization to be performed by a session management function, SMF, entity;
- training of QOS handling to be performed by a user plane function entity;
- training of a time-sensitive networking, TSN, related functionality to be performed by the user plane function entity;
- training of a radio specific procedure to be performed by a base station device;
- protocol specific optimization to be performed by the base station device;
- training of at least one of detection, decoding or power control to be performed by the client device;
- generating analytics related to radio access technology, RAT, or frequency selection to be performed by a network data analytics function, NWDAF, entity; or
- traffic steering to be performed by the NWDAF entity.

An example embodiment of a computer program comprises instructions for causing a client device to perform at least the following:
- detecting a trigger condition being satisfied for machine learning exploration for wireless communication network optimization; and
- in response, initiating establishment of a packet data unit, PDU, session for the machine learning exploration, the PDU session for the machine learning exploration being associated with a machine learning exploration indicator indicating that the PDU session is reserved for machine learning exploration.

An example embodiment of a network node device comprises at least one processor and at least one memory including computer program code. The at least one memory and the computer program code are configured to, with the at least one processor, cause the network node device to at least perform:
- detecting a need to perform machine learning exploration for wireless communication network optimization; and
- transmitting a request to perform the machine learning exploration to one or more client devices.

In an example embodiment, alternatively or in addition to the above-described example embodiments, the at least one memory and the computer program code are further configured to, with the at least one processor, cause the network node device to perform:
- selecting the one or more client devices to which the request to perform the machine learning exploration is to be transmitted based on a selection criterion comprising:
  - client device capability to support a packet data unit, PDU, session for machine learning exploration;
  - a detected performance issue;
  - client device inactivity status; or
  - a client device related identifier, user category or subscribed service.

In an example embodiment, alternatively or in addition to the above-described example embodiments, the network node device comprises an operation, administration, and maintenance, OAM, entity or a session management function, SMF, entity.

An example embodiment of a network node device comprises means for performing:
- detecting a need to perform machine learning exploration for wireless communication network optimization; and
- transmitting a request to perform the machine learning exploration to one or more client devices.

An example embodiment of a method comprises detecting, by a network node device, a need to perform machine learning exploration for wireless communication network optimization. The method further comprises transmitting a request to perform the machine learning exploration from the network node device to one or more client devices.

In an example embodiment, alternatively or in addition to the above-described example embodiments, the method further comprises selecting, by the network node device, the one or more client devices to which the request to perform the machine learning exploration is to be transmitted based on a selection criterion. The selection criterion comprises:

client device capability to support a packet data unit, PDU, session for machine learning exploration;
a detected performance issue;
client device inactivity status; or
a client device related identifier, user category or subscribed service.

In an example embodiment, alternatively or in addition to the above-described example embodiments, the network node device comprises an operation, administration, and maintenance, OAM, entity or a session management function, SMF, entity.

An example embodiment of a computer program comprises instructions for causing a network node device to perform at least the following:
detecting a need to perform machine learning exploration for wireless communication network optimization; and
transmitting a request to perform the machine learning exploration to one or more client devices.

DESCRIPTION OF THE DRAWINGS

The accompanying drawings, which are included to provide a further understanding of the embodiments and constitute a part of this specification, illustrate embodiments and together with the description help to explain the principles of the embodiments. In the drawings.

Like reference numerals are used to designate like parts in the accompanying drawings.

DETAILED DESCRIPTION

Reference will now be made in detail to embodiments, examples of which are illustrated in the accompanying drawings. The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
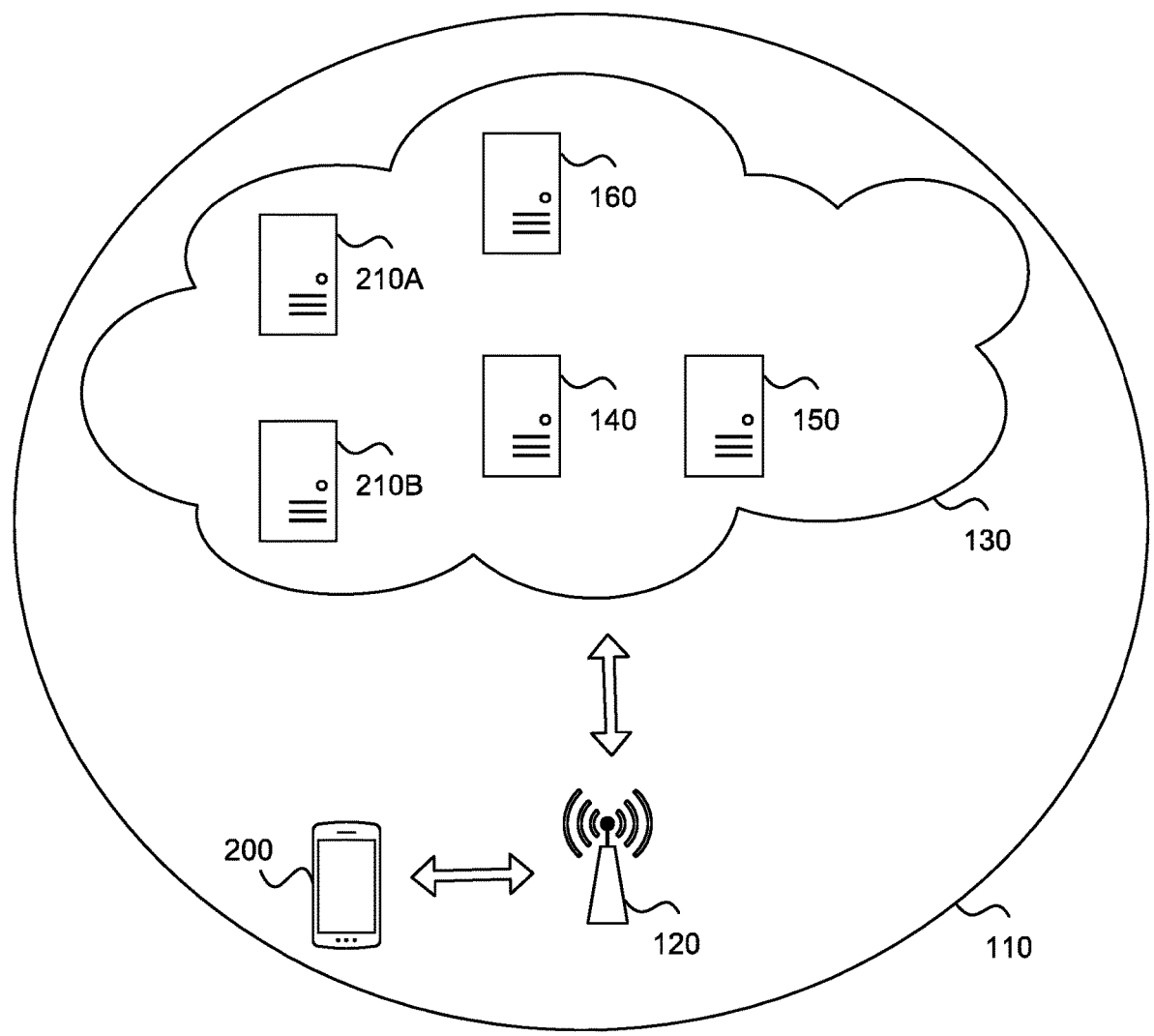
FIG. 1 shows an example embodiment of the subject matter described herein illustrating an example system, where various embodiments of the present disclosure may be implemented.

FIG. 1 illustrates an example system 100, where various embodiments of the present disclosure may be implemented. The system 100 may comprise a fifth generation (5G) new radio (NR) network 110. An example representation of the system 100 is shown depicting a client device 200, a base station device 120, and a 5G core (5GC) network 130. The 5GC network 130 may include, e.g., an access and mobility management function (AMF) entity 140, a network data analytics function (NWDAF) entity 150, a user plane function (UPF) entity 160, an operation, administration, and maintenance (OAM) entity 210A, and/or a session management function (SMF) entity 210B.

In at least some embodiments, the AMF entity 140 may receive connection and session related information from the client device 200, and it may be responsible for handling connection and mobility management tasks. The UPF entity 160 may support features and capabilities to facilitate user plane operation, such as packet routing and forwarding, interconnection to a data network, policy enforcement and data buffering. The SMF entity 210B may support, e.g., session management (such as session establishment, modification and release), client device IP address allocation and management, dynamic host configuration protocol (DHCP) functions, termination of non-access stratum (NAS) signalling related to session management, downlink (DL) data notification, and/or traffic steering configuration for the UPF 160 for traffic routing. The OAM entity 210A may support processes and functions used in provisioning and managing a network or element within a network.

In at least some embodiments, the NWDAF 150 may be responsible for collecting data from other 5GC network functions (NFs) as well as from the OAM 210A. In the OAM 210A, data may be collected, e.g., by means of performance measurements (PMs), key performance indicators (KPIs), traces, and minimization of drive test (MDT) jobs.

At least in some embodiments, the 5G NR network 110 may comprise one or more massive machine-to-machine (M2M) network (s), massive machine type communications (mMTC) network (s), internet of things (IoT) network (s), industrial internet-of-things (IIoT) network (s), enhanced mobile broadband (eMBB) network (s), ultra-reliable low-latency communication (URLLC) network (s), and/or the like. In other words, the 5G NR network 110 may be configured to serve diverse service types and/or use cases, and it may logically be seen as comprising one or more networks.

The client device 200 may include, e.g., a mobile phone, a smartphone, a tablet computer, a smart watch, or any hand-held or portable device. The client device 200 may also be referred to as a user equipment (UE). The base station device 120 may include, e.g., a fifth-generation base station (gNB) or any such device suitable for providing an air interface for client devices to connect to a wireless network via wireless transmissions.

Figure 4:
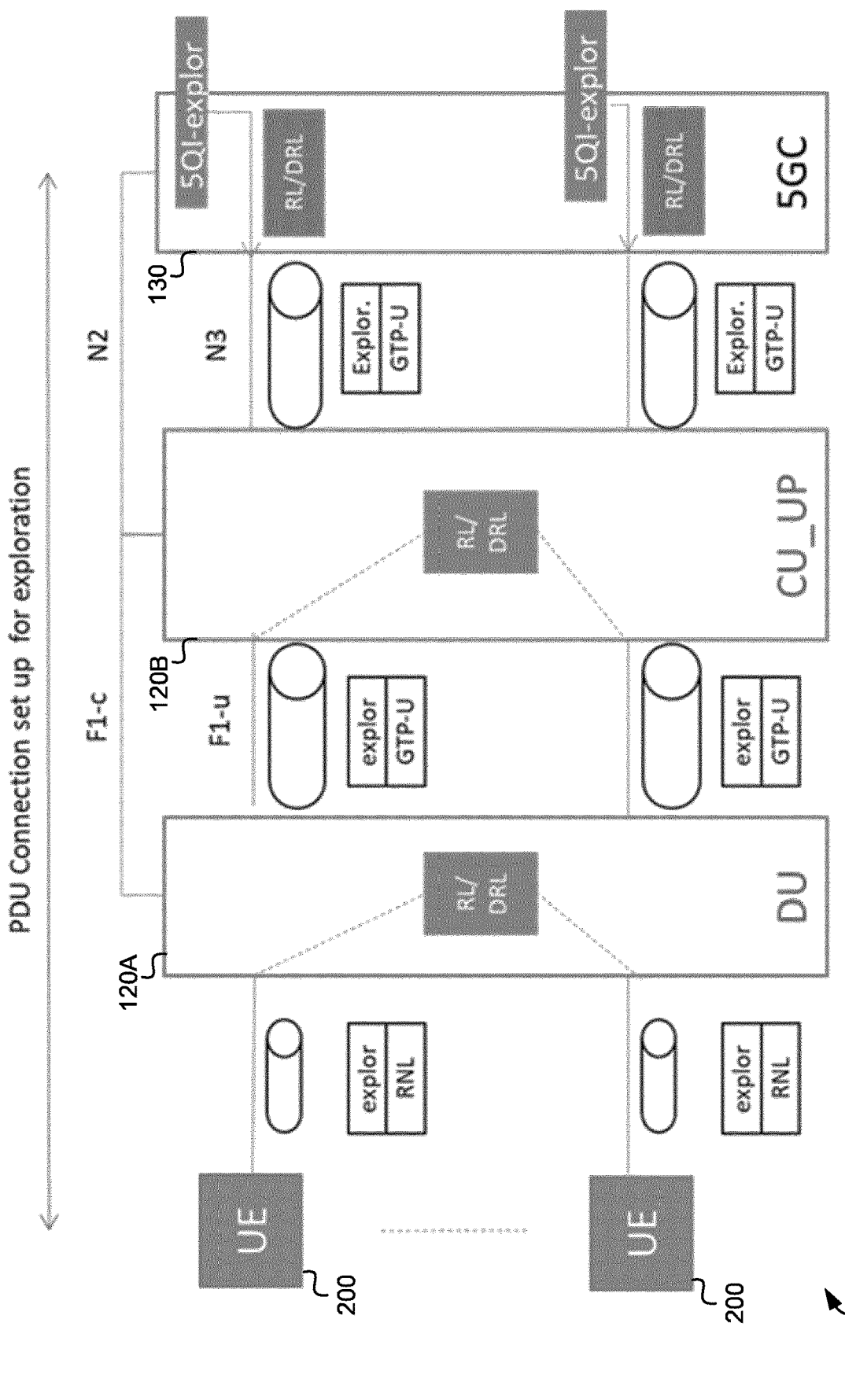
FIG. 4 shows an example embodiment of the subject matter described herein illustrating PDU connection setup.

As illustrated in FIG. 4, the base station device 120 may be logically split into centralized units and distributed units. More specifically, the base station device 120 may be logically split into a gNB-central unit (gNB-CU) and one or more gNB-distributed units (gNB-DU) 120A. Furthermore, the gNB-CU may be logically split into a control plane (CP) part or entity (gNB-CUCP) and one or more user plane (UP) parts or entities (gNB-CU-UP) 120B. Accordingly, the 5G gNB 120 may provide 5G user plane and control plane protocol termination towards the client device 200. UP may be used to carry user traffic, such as voice, and Internet traffic, whereas CP may be used to carry, e.g., control messages used for signaling in the system 100.

The gNB-CU is a logical node that may host higher layer protocols, such as radio resource control (RRC), service data adaptation protocol (SDAP), and packet data convergence protocol (PDCP). The gNB-DUs are logical nodes that may host, e.g., radio link control (RLC), medium access control (MAC), and higher physical (PHY) layers.

As shown in FIG. 4, an F1-C interface may be used, e.g., to provide a control plane inter-connection of the gNB-CU-UP 120B and the gNB-DU 120A, whereas an F1-U interface may be used, e.g., to provide a user plane inter-connection of the gNB-CU-UP 120B and the qNB-DU 120A. An N3 interface may be used, e.g., to provide an inter-connection between the gNB 120 and the UPF 160 for conveying user data. An N2 interface may be used, e.g., to provide a control plane inter-connection between the gNB 120 and the 5GC 130.

In the following, various example embodiments will be discussed. At least some of these example embodiments may allow a packet data unit session for machine learning exploration for wireless communication network optimization. More specifically, at least some of these example embodiments may allow dedicated end-to-end exploration connections for training of reinforcement learning (RL) and/or deep reinforcement learning (DRL) algorithms over live mobile networks. Accordingly, an RL and/or DRL algorithm can be trained over live mobile networks without harming its correct working operations and without having to rely on artificial intelligence (AI) and/or machine learning (ML) support at each network node.

As used herein, RL refers to an area of machine learning in which an agent makes observations and takes actions within an environment, and in return it estimates rewards. The agent's objective is to learn to act in a way that will maximize its expected rewards over time. In this way, the agent learns by trial and error an optimal or near-optimal policy. During the training phase, the agent may take a random action with a small probability in order to boost the agent learning and to explore a full state space. This is called exploration, and it is different from an exploitation process in which the agent takes an action suggested by a policy (i.e., the one that maximize the expected revenue). In this way, the agent can explore the full state space of the system with which it is interacting and learn the optimal policy—as even an action that returns an immediate reward lower than another may lead to an overall higher revenue.

Figure 2A:
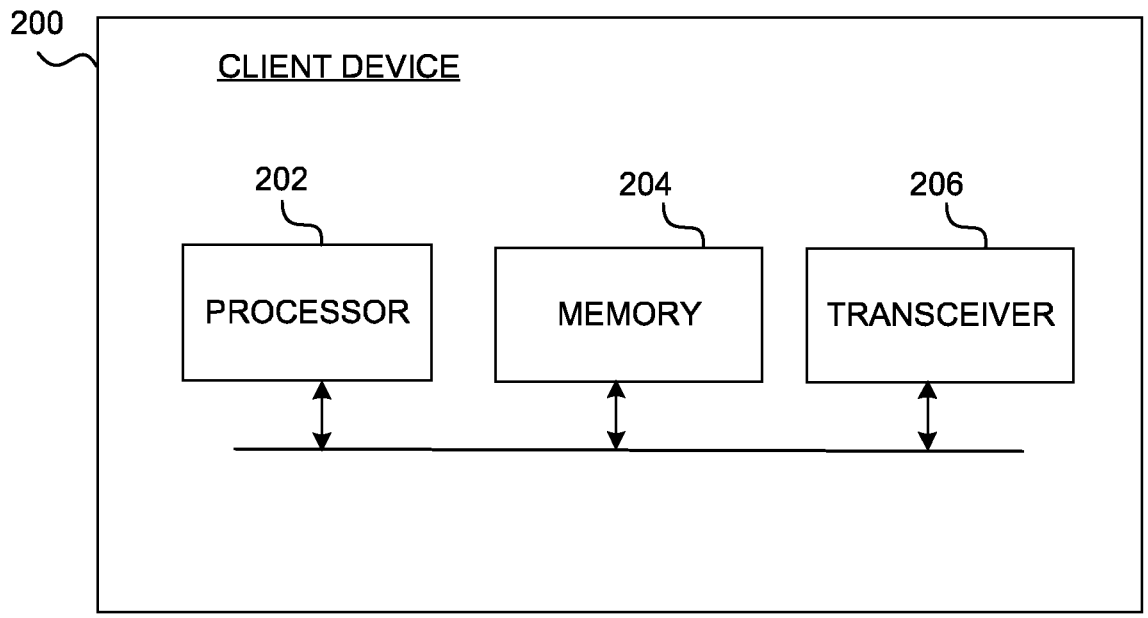
FIG. 2A shows an example embodiment of the subject matter described herein illustrating an example client device, where various embodiments of the present disclosure may be implemented.

FIG. 2A is a block diagram of the client device 200, in accordance with an example embodiment.

The client device 200 comprises one or more processors 202 and one or more memories 204 that comprise computer program code. The client device 200 may also include other elements, such as a transceiver 206, as well as other elements not shown in FIG. 2A.

Although the client device 200 is depicted to include only one processor 202, the client device 200 may include more processors. In an embodiment, the memory 204 is capable of storing instructions, such as an operating system and/or various applications. Furthermore, the memory 204 may include a storage that may be used to store, e.g., at least some of the information and data used in the disclosed embodiments.

Furthermore, the processor 202 is capable of executing the stored instructions. In an embodiment, the processor 202 may be embodied as a multi-core processor, a single core processor, or a combination of one or more multi-core processors and one or more single core processors. For example, the processor 202 may be embodied as one or more of various processing devices, such as a coprocessor, a microprocessor, a controller, a digital signal processor (DSP), a processing circuitry with or without an accompanying DSP, or various other processing devices including integrated circuits such as, for example, application specific integrated circuit (ASIC), a field programmable gate array (FPGA), a microcontroller unit (MCU), a hardware accelerator, a special-purpose computer chip, or the like. In an embodiment, the processor 202 may be configured to execute hard-coded functionality. In an embodiment, the processor 202 is embodied as an executor of software instructions, wherein the instructions may specifically configure the processor 202 to perform the algorithms and/or operations described herein when the instructions are executed.

The memory 204 may be embodied as one or more volatile memory devices, one or more non-volatile memory devices, and/or a combination of one or more volatile memory devices and non-volatile memory devices. For example, the memory 204 may be embodied as semiconductor memories (such as mask ROM, PROM (programmable ROM), EPROM (erasable PROM), flash ROM, RAM (random access memory), etc.).

The client device 200 may be any of various types of devices used directly by an end user entity and capable of communication in a wireless network, such as user equipment (UE). Such devices include but are not limited to smartphones, tablet computers, smart watches, lap top computers, internet-of-things (IOT) devices, massive machine-to-machine (M2M) devices, massive machine type communications (mMTC) devices, industrial internet-of-things (IIOT) devices, enhanced mobile broadband (eMBB) devices, ultra-reliable low-latency communication (URLLC) devices, etc.

The at least one memory 204 and the computer program code are configured to, with the at least one processor 202, cause the client device 200 to at least perform detecting that a trigger condition is satisfied for machine learning exploration for wireless communication network 110 optimization. For example, the trigger condition may comprise a need detected by the client device 200 to perform the machine learning exploration, and/or a request to perform the machine learning exploration received from a network node device 210. The network node device 210 will de discussed in more detail in connection with FIG. 2B. In other words, the client device 200 may detect, e.g., a need to perform training of client device procedures and request PDU session establishment, or another network entity (such as the OAM 210A or the SMF 210B) may detect a need to perform training, select corresponding client device (s), and then trigger the corresponding client device (s) to establish the PDU session (s). In at least some embodiments, any network entity may request the SMF 210B to perform training, including a list of selection criteria and training objectives.

In at least some embodiments, the wireless communication network 110 optimization for which the machine learning exploration is to be used may comprise, e.g., mobility optimization to be performed by the AMF entity 140 (e.g., the AMF entity 140 may use this AI/ML PDU session for mobility optimization, e.g., by selecting client device(s) that are likely to experience a handover, or by duplicating traffic and using different handover parameterization), traffic steering optimization to be performed by the SMF entity 210B (e.g., the SMF entity 210B may use this AI/ML PDU session to explore different traffic steering optimizations by setting up AI/ML PDU sessions and applying different filters), training of quality-of-service (QOS) handling to be performed by the UPF entity 160, training of a time-sensitive networking (TSN) related functionality to be performed by the UPF entity 160, training of a radio specific procedure (such as link adaptation, scheduling, or the like) to be performed by the base station device 120, protocol (such as MAC (medium access control), RLC (radio link control), and/or RRC (radio resource control) protocols) specific optimization to be performed by the base station device 120, training of detection, decoding and/or power control to be performed by the client device 200, generating analytics related to radio access technology (RAT) or frequency selection to be performed by the NWDAF entity 150, and/or traffic steering to be performed by the NWDAF entity 150.

In response, the at least one memory 204 and the computer program code are further configured to, with the at least one processor 202, cause the client 200 to perform initiating establishment of a packet data unit (PDU) session for the machine learning exploration. In at least some embodiments, the PDU session may be established between the client device 200 and the UPF entity 160.

The PDU session for the machine learning exploration is associated with a machine learning exploration indicator (such as a tag, parameter or type) which indicates that the PDU session is reserved for machine learning exploration. For example, the machine learning exploration indicator may comprise a QoS identifier value indicating machine learning exploration (such as a 501 (5G QOS identifier) value defined for ML training or OAM purposes), a PDU session attribute indicating machine learning exploration (such as a PDU session attribute indicating whether the PDU session is used for AI/ML exploration data), a single network slice selection assistance information (S-NSSAI) identifier indicating machine learning exploration (such as a dedicated predefined S-NSSAI to indicate that the PDU session is used for AI/ML exploration data), and/or a PDU session identifier indicating machine learning exploration (such as a dedicated predefined PDU session ID that is not used for actual communication).

In other words, the disclosure allows a mechanism enabling training of AI/ML algorithms, such as RL/DRL algorithms, in live wireless communication networks. The 5G system 100 may use, e.g., a specific tag or parameter or type to indicate that a PDU session is set up for AI/ML exploration. The PDU session may be set up in a live wireless communication network but, due to the "AI/ML exploration indication", the exploration performed in the network does not harm other PDU sessions that underly Qos constraints and service level agreements (SLAs). Any suitable network entity between the UPF 160 and the client device 200 may utilize this PDU session in order to perform training, e.g., the gNB 120 may use this PDU session to train link adaptation, beam selection, scheduling; the client device 200 may use this PDU session for channel measurements; the AMF 140 may use this PDU session for mobility optimization; and the SMF 210B may use this PDU session to optimize PDU session related processes and signalling.

In at least some embodiments, exploration data for the machine learning exploration may comprise randomly generated data, data generated based on previously recorded data, and/or data generated based on a parallel PDU session that is not used for machine learning exploration. That is, data may be generated based on another, parallel PDU session such that data is duplicated over both PDU sessions. For this option, a corresponding PDU session ID may be provided which is to be duplicated, e.g., the PDU session for AI/ML exploration may reuse the same PDU session ID which is to be duplicated. Alternatively, a dedicated PDU session attribute may be introduced.

In other words, depending on the optimization use case, the dedicated PDU sessions may convey random data or actual data which may be generated by, e.g., a node in the data network, which node may be deployed by a wireless network 110 operator in order to provide training data. The former case may be sufficient for, e.g., optimizing radio network procedures, such as user mobility, power control, link adaptation, and/or dynamic channel allocation. When the RL/DRL algorithm aims to optimize use cases in which the statistics of the traffic matter (as for example when dealing with load balancing or traffic steering), then real PDU sessions may be duplicated as exploration data. In this way, the RL/DRL algorithm may be trained capturing real traffic behavior without impacting live wireless communication networks. In this case, active client devices 200 may be selected taking into consideration the network load.

Figure 2B:
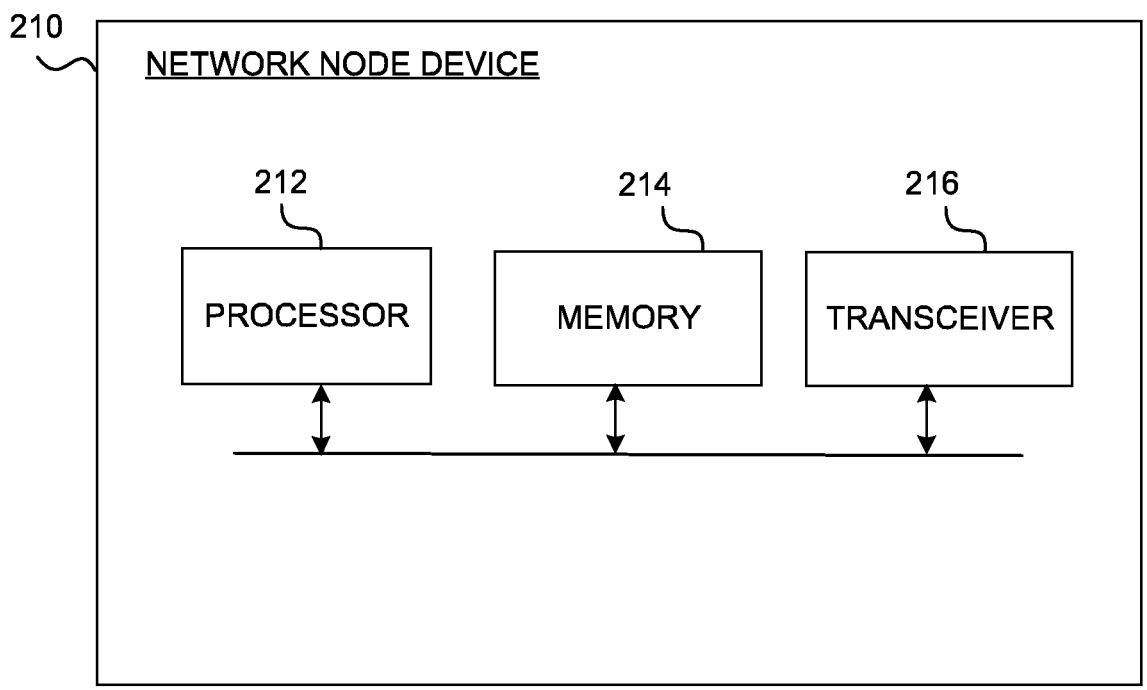
FIG. 2B shows an example embodiment of the subject matter described herein illustrating an example network node device, where various embodiments of the present disclosure may be implemented.

FIG. 2B is a block diagram of a network node device 210, in accordance with an example embodiment.

The network node device 210 comprises at least one processor 212 and at least one memory 214 including computer program code. The network node device 210 may also include other elements, such as a transceiver 216.

Although the network node device 210 is depicted to include only one processor 212, the network node device 210 may include more processors. In an embodiment, the memory 214 is capable of storing instructions, such as an operating system and/or various applications. Furthermore, the memory 214 may include a storage that may be used to store, e.g., at least some of the information and data used in the disclosed embodiments.

Furthermore, the processor 212 is capable of executing the stored instructions. In an embodiment, the processor 212 may be embodied as a multi-core processor, a single core processor, or a combination of one or more multi-core processors and one or more single core processors. For example, the processor 212 may be embodied as one or more of various processing devices, such as a coprocessor, a microprocessor, a controller, a digital signal processor (DSP), a processing circuitry with or without an accompanying DSP, or various other processing devices including integrated circuits such as, for example, application specific integrated circuit (ASIC), a field programmable gate array (FPGA), a microcontroller unit (MCU), a hardware accelerator, a special-purpose computer chip, or the like. In an embodiment, the processor 212 may be configured to execute hard-coded functionality. In an embodiment, the processor 212 is embodied as an executor of software instructions, wherein the instructions may specifically configure the processor 212 to perform the algorithms and/or operations described herein when the instructions are executed.

The memory 214 may be embodied as one or more volatile memory devices, one or more non-volatile memory devices, and/or a combination of one or more volatile memory devices and non-volatile memory devices. For example, the memory 214 may be embodied as semiconductor memories (such as mask ROM, PROM (programmable ROM), EPROM (erasable PROM), flash ROM, RAM (random access memory), etc.).

In at least some embodiments, the network node device 210 may comprise an operation, administration, and maintenance (OAM) entity, such as the OAM entity 210A of FIG. 1, or a session management function (SMF) entity, such as the SMF entity 210B of FIG. 1.

The at least one memory 214 and the computer program code are configured to, with the at least one processor 212, cause the network node device 210 to at least perform detecting a need to perform machine learning exploration for wireless communication network 110 optimization.

The at least one memory 214 and the computer program code are further configured to, with the at least one processor 212, cause the network node device 210 to perform transmitting a request to perform the machine learning exploration to one or more client devices 200.

The at least one memory 214 and the computer program code may be further configured to, with the at least one processor 212, cause the network node device 210 to perform selecting the one or more client devices 200 to which the request to perform the machine learning exploration is to be transmitted based on a selection criterion. For example, the selection criterion may comprise capability of the client device 200 to support a PDU session for machine learning exploration, a detected performance issue, inactivity status of the client device 200, and/or a client device 200 related identifier, user category or subscribed service.

In other words, the client device selection may be performed by, e.g., the OAM 210A or the SMF 210B based, e.g., on one or more of the following criteria:
- client device (s) supporting PDU session for AI/ML exploration may be selected,
- the OAM 210A may select client device (s) based on detected performance issues,
- client device (s) may be selected (and PDU sessions may be generated) if the client device (s) are in idle mode, or
- client device (s) may be selected based on their 5QI, application ID, user category, and/or subscribed services in a unified data repository (UDR) in case the optimization task at hand requires separation of different traffic types.

Thus, creating dedicated PDU sessions for exploration data has the advantage of creating a training/test environment over live wireless communication networks. In addition, the disclosure allows selection criteria to identify the client devices 200 and network condition (s) on which to establish such a PDU session, e.g., to avoid overloading the network. The selection criteria may depend, e.g., on a use case, such as in case of radio network parameter optimization, inactive client devices may be selected.

Further features (such as those related to the trigger condition, the machine learning exploration indicator, the exploration data, the PDU session, and the wireless communication network 110 optimization) of the network node device 210 directly result from the functionalities and parameters of the client device 200 and thus are not repeated here.

Figure 3:
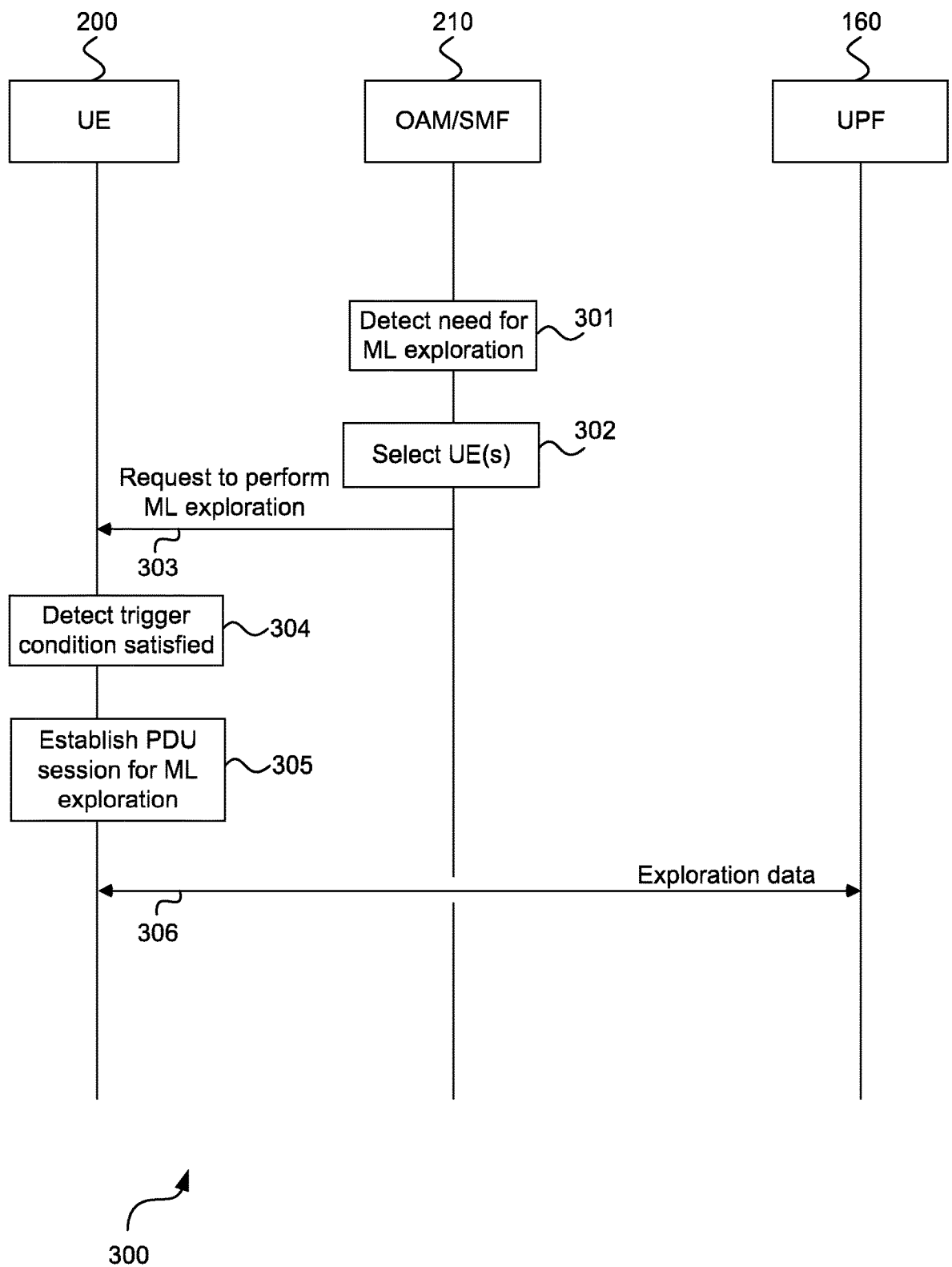
FIG. 3 shows an example embodiment of the subject matter described herein illustrating a method.

FIG. 3 illustrates an example signaling diagram 300 of a method, in accordance with an example embodiment.

At operation 301, the network node device 210 detects a need to perform machine learning exploration for wireless communication network optimization.

At operation 302, the network node device 210 selects one or more client devices 200 to which a request to perform the machine learning exploration is to be transmitted based on a selection criterion. As discussed above in more detail, the selection criterion may comprise client device capability to support a PDU session for machine learning exploration, a detected performance issue, client device inactivity status, and/or a client device related identifier, user category or subscribed service.

At operation 303, the network node device 210 transmits the request to perform the machine learning exploration to the one or more client devices 200.

At operation 304, the client device 200 detects a trigger condition being satisfied for machine learning exploration for wireless communication network optimization. As discussed above in more detail, the trigger condition may comprise a need detected by the client device 200 to perform the machine learning exploration. Additionally/alternatively, as in the case of the example of FIG. 3, the trigger condition may comprise the request to perform the machine learning exploration received from the network node device 210 at operation 303.

In response, at operation 305, the client device 200 initiates establishment of a PDU session for the machine learning exploration. As discussed above in more detail, the PDU session for the machine learning exploration is associated with a machine learning exploration indicator indicating that the PDU session is reserved for machine learning exploration. As also discussed above in more detail, At optional operation 306, the PDU session may be established between the client device 200 and the UPF entity 160.

The method of diagram 300 may be performed by the client device 200 of FIG. 2A and the network node device 210 of FIG. 2B. The operations 301-303 can, for example, be performed by the at least one processor 212 and the at least one memory 214. The operations 303-306 can, for example, be performed by and/or the at least one processor 202 and the at least one memory 204. Further features of the method of diagram 300 directly result from the functionalities and parameters of the network node device 210 and the client device 200, and thus are not repeated here. The method of diagram 300 can be performed by computer program (s).

FIG. 4 shows an example embodiment of the subject matter described herein illustrating PDU connection setup. More specifically, diagram 400 of FIG. 4 illustrates the PDU connection setup via the base station device 120. In other words, FIG. 4 illustrates that once a corresponding PDU Session indicated with '5QI-explor' has been set up, intermediate nodes may utilize it for RL/DRL. Thus, any node in the communication network may utilize the PDU Session for exploration. Between client devices 200 and the gNB-DU 120A, exploration data may be transferred, e.g., via a radio network layer (RNL) tunnels, whereas between the gNB-DU 120A and the gNB-CU-UP 120B as well as between the gNB-CU-UP 120B and the 5GC 130 exploration data may be transferred, e.g., via GPRS tunneling protocol for the user plane (GTP-U) tunnels.

Figure 5A:
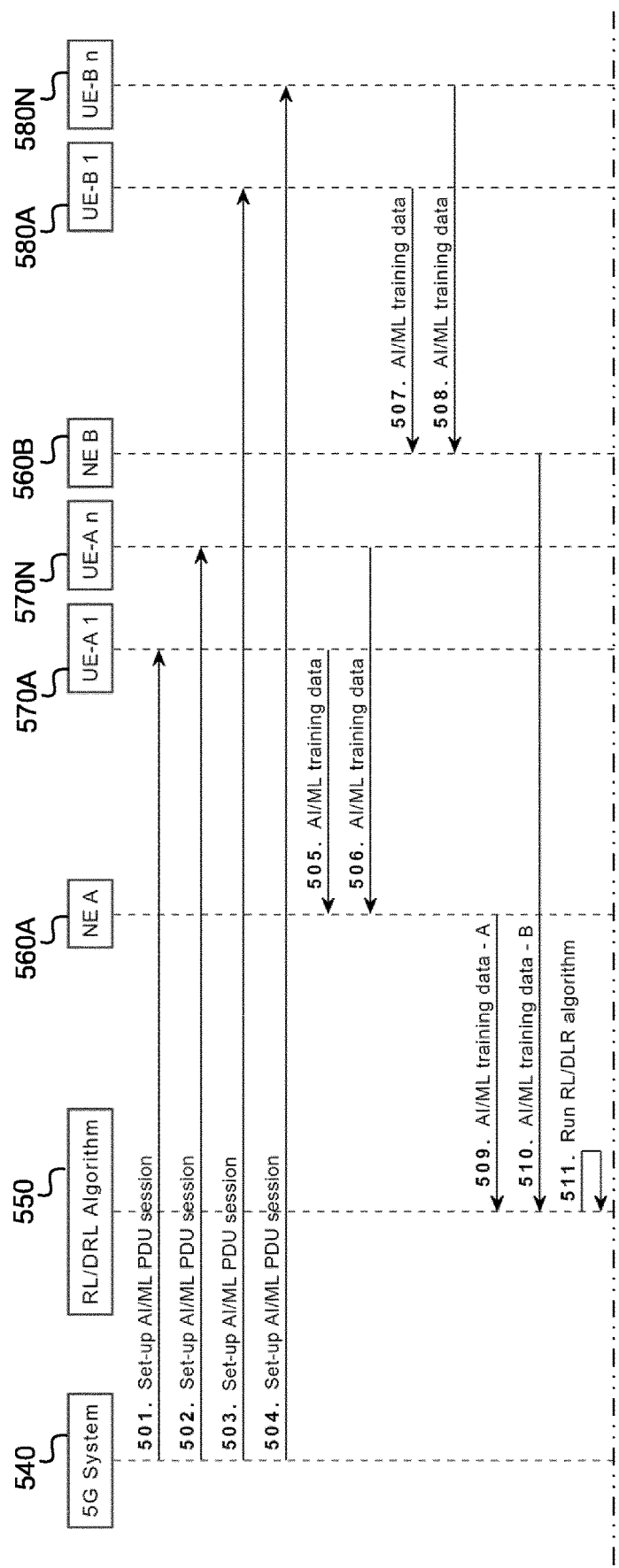
FIGS. 5A and 5B show an example embodiment of the subject matter described herein illustrating message exchange.
Figure 5B:
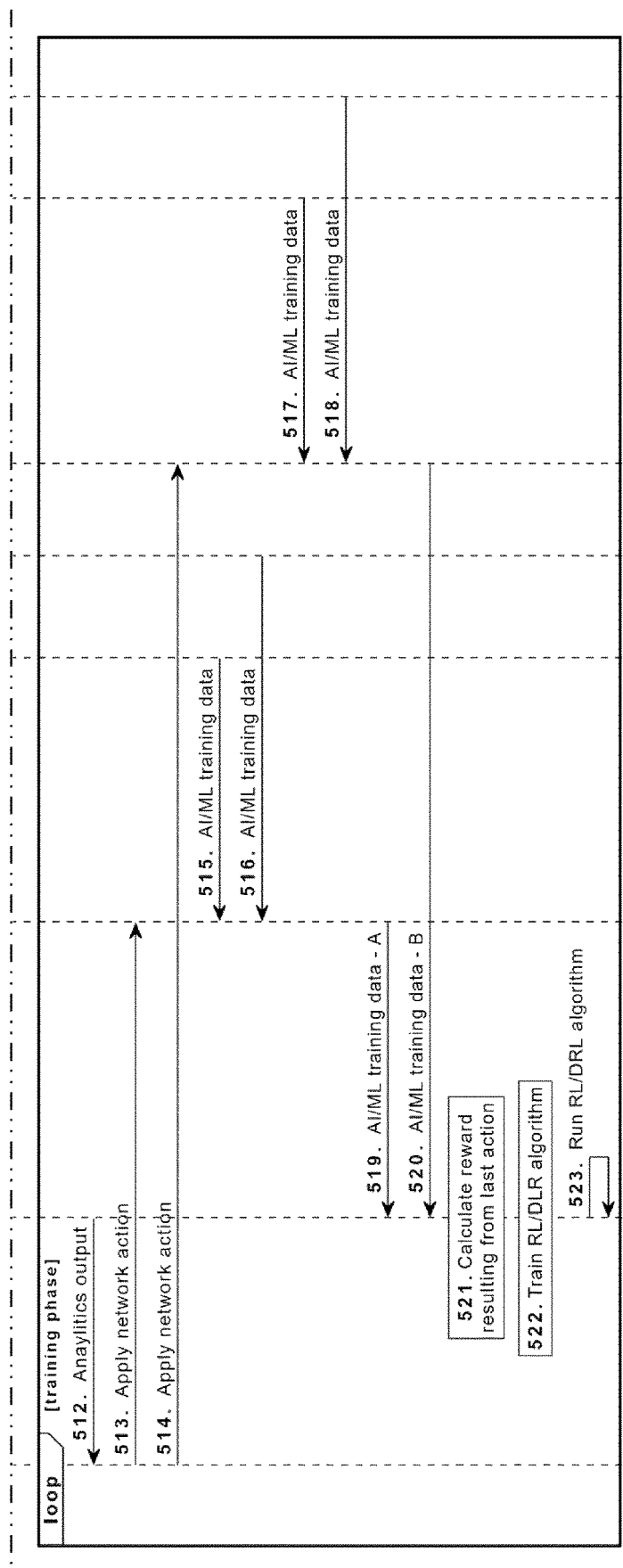

FIGS. 5A and 5B show an example diagram 500 illustrating message exchange. FIG. 5B is a direct continuation of FIG. 5A.

At operation 501, an AI/ML PDU session is established for client device 570A. At operation 502, an AI/ML PDU session is established for client device 570N. At operation 503, an AI/ML PDU session is established for client device 580A. At operation 504, an AI/ML PDU session is established for client device 580N.

At operation 505, AI/ML training data is provided from client device 570A to network entity 560A. At operation 506, AI/ML training data is provided from client device 570N to network entity 560A. At operation 507, AI/ML training data is provided from client device 580A to network entity 560B. At operation 508, AI/ML training data is provided from client device 580N to network entity 560B.

At operation 509, the AI/ML training data is forwarded from network entity 560A to RL/DRL algorithm 550. At operation 510, the AI/ML training data is forwarded from network entity 560B to RL/DRL algorithm 550.

At operation 511, RL/DRL algorithm 550 is executed, triggering the training phase of operations 512 to 523 which may be run in a loop.

At operation 512, analytics data is output from RL/DRL algorithm 550 to 5G system 540. At operation 513, 5G system 540 applies a network action to network entity 560A. At operation 514, 5G system 540 applies a network action to network entity 560B.

At operation 515, further AI/ML training data is provided from client device 570A to network entity 560A. At operation 516, further AI/ML training data is provided from client device 570N to network entity 560A. At operation 517, further AI/ML training data is provided from client device 580A to network entity 560B. At operation 518, further AI/ML training data is provided from client device 580N to network entity 560B.

At operation 519, the further AI/ML training data is forwarded from network entity 560A to RL/DRL algorithm 550. At operation 520, the further AI/ML training data is forwarded from network entity 560B to RL/DRL algorithm 550. At operation 521, RL/DRL algorithm 550 calculates a reward resulting from the last action, based on which RL/DRL algorithm 550 is trained, operation 522. At operation 523, RL/DRL algorithm 550 is executed again.

The functionality described herein can be performed, at least in part, by one or more computer program product components such as software components. According to an embodiment, the client device 200 and/or the network node device 210 may comprise a processor configured by the program code when executed to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), and Graphics Processing Units (GPUS).

Any range or device value given herein may be extended or altered without losing the effect sought. Also, any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the embodiments described above may be combined with aspects of any of the other embodiments described to form further embodiments without losing the effect sought.

The term 'comprising' is used herein to mean including the method, blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A client device, comprising:
   at least one processor; and
   at least one memory including computer program code;
   the at least one memory and the computer program code configured to, with the at least one processor, cause the client device to at least perform:
   receiving, from a network node device, a request to perform machine learning exploration comprising traffic steering optimization;
   detecting a trigger condition being satisfied for the machine learning exploration for wireless communication network optimization, wherein the wireless communication network optimization comprises the traffic steering optimization to be performed by a session management function, SMF, entity by initiating at least one packet data unit session and applying a plurality of different filters, and wherein the wireless communication network optimization further comprises at least one of:
   mobility optimization to be performed by an access and mobility management function, AMF, entity;
   training of a time-sensitive networking, TSN, related functionality to be performed by the user plane function entity;
   training of a radio specific procedure to be performed by a base station device;
   protocol specific optimization to be performed by the base station device;
   training of at least one of detection, decoding or power control to be performed by the client device; or
   generating analytics related to radio access technology, RAT, or frequency selection to be performed by a network data analytics function, NWDAF, entity; and
   in response, initiating establishment of a packet data unit, PDU, session for the machine learning exploration, the PDU session for the machine learning exploration being associated with a machine learning exploration indicator indicating that the PDU session is reserved for machine learning exploration.

2. The client device according to claim 1, wherein the trigger condition comprises at least one of:
   a need detected by the client device to perform the machine learning exploration; or
   a request to perform the machine learning exploration received from a network node device.

3. The client device according to claim 1, wherein the machine learning exploration indicator comprises at least one of:
   a quality-of-service, QoS, identifier value indicating machine learning exploration;
   a PDU session attribute indicating machine learning exploration;

a single network slice selection assistance information, S-NSSAI, identifier indicating machine learning exploration; or a PDU session identifier indicating machine learning exploration.

4. The client device according to claim 1, wherein exploration data for the machine learning exploration comprises at least one of:

randomly generated data;

data generated based on previously recorded data; or data generated based on a parallel, non-machine learning exploration, PDU session.

5. The client device according to claim 1, wherein the PDU session is to be established between the client device and a user plane function entity.

6. The client device according to claim 1, wherein the wireless communication network optimization further comprises:

training of QoS handling to be performed by a user plane function entity.

7. A network node device, comprising:

at least one processor; and at least one memory including computer program code;

the at least one memory and the computer program code configured to, with the at least one processor, cause the network node device to at least perform:

detecting a need to perform the machine learning exploration for wireless communication network optimization, wherein the wireless communication network optimization comprises traffic steering optimization to be performed by a session management function, SMF, entity by initiating at least one packet data unit session and applying a plurality of different filters, and wherein the wireless communication network optimization further comprises at least one of:

mobility optimization to be performed by an access and mobility management function, AMF, entity;

training of a time-sensitive networking, TSN, related functionality to be performed by the user plane function entity;

training of a radio specific procedure to be performed by a base station device;

protocol specific optimization to be performed by the base station device;

training of at least one of detection, decoding or power control to be performed by the client device; or generating analytics related to radio access technology, RAT, or frequency selection to be performed by a network data analytics function, NWDAF, entity; and transmitting a request to perform the machine learning exploration comprising the traffic steering optimization to one or more client devices.

8. The network node device according to claim 7, wherein the at least one memory and the computer program code are further configured to, with the at least one processor, cause the network node device to perform:

selecting the one or more client devices to which the request to perform the machine learning exploration is to be transmitted based on a selection criterion comprising:

client device capability to support a packet data unit, PDU, session for machine learning exploration;

a detected performance issue;

client device inactivity status; or a client device related identifier, user category or subscribed service.

9. The network node device according to claim 7, wherein the network node device comprises an operation, administration, and maintenance, OAM, entity or a session management function, SMF, entity.

* * * * *